United States Patent
Feijoo

(10) Patent No.: US 11,669,497 B2
(45) Date of Patent: Jun. 6, 2023

(54) MULTI-WEB APPLICATION COLLABORATION TECHNIQUES

(71) Applicant: CITRIX SYSTEMS, INC., Fort Lauderdale, FL (US)

(72) Inventor: Ricardo Fernando Feijoo, Davie, FL (US)

(*) Notice: Subject to any disclaimer, the term of this patent is extended or adjusted under 35 U.S.C. 154(b) by 404 days.

(21) Appl. No.: 16/569,906

(22) Filed: Sep. 13, 2019

(65) Prior Publication Data

US 2021/0081362 A1 Mar. 18, 2021

(51) Int. Cl.
| | | |
|---|---|---|
| G06F 16/10 | (2019.01) | |
| G06F 16/176 | (2019.01) | |
| H04L 67/06 | (2022.01) | |
| G06F 16/93 | (2019.01) | |
| H04L 67/561 | (2022.01) | |

(52) U.S. Cl.
CPC ............ *G06F 16/176* (2019.01); *G06F 16/93* (2019.01); *H04L 67/06* (2013.01); *H04L 67/561* (2022.05)

(58) Field of Classification Search
CPC ....... G06F 16/176; G06F 16/93; H04L 67/06; H04L 67/2804
See application file for complete search history.

(56) References Cited

U.S. PATENT DOCUMENTS

| | | | | |
|---|---|---|---|---|
| 8,850,010 | B1* | 9/2014 | Qureshi | G06F 21/41 709/225 |
| 8,850,050 | B1* | 9/2014 | Qureshi | G06F 21/6218 709/227 |
| 8,918,529 | B1* | 12/2014 | Batchu | H04L 63/20 709/229 |
| 8,965,926 | B2* | 2/2015 | Gur-esh | G06F 16/951 713/165 |
| 2002/0184095 | A1* | 12/2002 | Scullard | G06Q 30/0269 705/26.1 |
| 2008/0016091 | A1* | 1/2008 | Chandra | G06F 16/9562 |
| 2010/0070851 | A1* | 3/2010 | Chen | G06F 16/986 715/236 |
| 2013/0290479 | A1* | 10/2013 | Faher | H04L 67/06 709/217 |
| 2014/0297860 | A1* | 10/2014 | Qureshi | G06F 21/41 709/225 |

(Continued)

FOREIGN PATENT DOCUMENTS

CN 105247531 B * 3/2018 ............. G06F 21/00

OTHER PUBLICATIONS

7 Tips for working carefully with collaboration apps) (published Nov. 29, 2017) (Year: 2017).*

*Primary Examiner* — Shahid K Khan

(57) ABSTRACT

A computer system includes client devices operated by users collaborating on a project, and a collaboration server. Each client device remotely accesses web applications via a managed browser to be used by the users collaborating on the project. The collaboration server cooperates with the managed browsers to receive from the managed browsers data corresponding to actions performed by each user within the web applications, generate notifications based on the actions performed by the users within the web applications, and cause the managed browsers to display the notifications. The notifications are generated independent from the web applications.

21 Claims, 12 Drawing Sheets

(56) References Cited

U.S. PATENT DOCUMENTS

2016/0162173 A1* 6/2016 Chandra ................. H04L 67/02
　　　　　　　　　　　　　　　　　　　　　　　　715/747
2018/0284957 A1* 10/2018 Afsari ................... H04L 65/403
2019/0057088 A1* 2/2019 Chander ............... G06F 16/907

* cited by examiner

/Project-Home/Historical.Audit.Data.com

Web App 1 (word processing)
Team Member A updated file on Aug. 25 at 10:52 am
Page 2 was changed as follows: xxxxxx
Page 8 was changed as follows: xxxxxx Team Member C updated file on Aug. 22 at 1:20 pm
Page 1 was changed as follows: xxxxxx
Page 4 was changed as follows: xxxxxx

Web App 2 (spread sheet)
Team Member E updated file on Aug. 19 at 3:25 pm
Column 2, line 6 was changed as follows: xxxxxx
Column 2, line 8 was changed as follows: xxxxxx Team Member B updated file on Aug. 18 at 4:22 pm
Column 4, line 12 was changed as follows: xxxxxx
Column 7, line 10 was changed as follows: xxxxxx Team Member A updated file on Aug. 16 at 9:15 am
Column 2, line 12 was changed as follows: xxxxxx
Column 7, line 10 was changed as follows: xxxxxx

Web App 3 (budget)
Team Member A updated file on Aug. 25 at 2:50 pm
Budget entries on page 2 were changed as follows: xxxxxx

Web App 4 (file sharing)
Team Member D uploaded file xxxxxx on Aug. 23 at 11:28 am
Team Member E deleted file xxxxxx on Aug. 22 at 9:58 am

• • •

Web App N (human resources)
PTO approved for Team Member C on Aug. 21 at 2:27 pm
Team Member C requested PTO on Aug. 20 at 2:27 pm
for days xxxxxx

*FIG. 10*

MULTI-WEB APPLICATION COLLABORATION TECHNIQUES

TECHNICAL FIELD

The present disclosure relates to computing systems and infrastructure, and more particularly, to techniques for collaboration using different web applications.

BACKGROUND

Web applications or apps are software programs that run on a server and are accessed remotely by client devices through a web browser. That is, while web applications have a similar functionality to native applications installed directly on the client device, web applications are instead installed and run on the server, and only the browser application is installed on the client device. Although in some implementations, a hosted browser running on a virtualization server may be used to access web applications as well.

One advantage of using web applications is that this allows client devices to run numerous different applications without having to install all of these applications on the client device. This may be particularly beneficial for thin client devices, which typically have reduced memory and processing capabilities. Moreover, updating web applications may be easier than native applications, as updating is done at the server level rather than having to push out updates to numerous different types of client devices.

Software as a Service (SaaS) is a web application licensing and delivery model in which applications are delivered remotely as a web-based service, typically on a subscription basis. SaaS is used for delivering several different types of business (and other) applications, including office, database, accounting, customer relation management (CRM), etc.

SUMMARY

A computer system includes a plurality of client devices operated by users collaborating on a project, with each client device configured to remotely access a plurality of web applications via a managed browser to be used by the users collaborating on the project. At least one server is cooperating with the managed browsers to receive from the managed browsers data corresponding to actions performed by each user within the web applications, generate notifications based on the actions performed by the users within the web applications, and cause the managed browsers to display the notifications. The notifications are generated independent from the web applications.

The notifications may comprise graphical overlays displayed over the web applications. Alternatively, the notifications may be provided on project web pages.

The at least one server may be further configured to compare the actions performed by at least one user to a set of actions, with the notifications being displayed based on the performed actions being in the set of actions.

The at least one server may be further configured to store the received data so as to provide a record of actions performed by at least one user collaborating on the project.

The at least one server may be further configured to map the actions performed by at least one user to each respective web application.

The at least one server may be further configured to map the actions performed by at least one respective user collaborating on the project.

The project may be based on documents created by the web applications. At least some of the actions performed by the users within the web applications correspond to changes made in the created documents. In addition, at least some of the actions performed by the users within the web applications correspond to at least one of reading a document, deleting a document, approving a document, making a request via a document, and uploading a document to a collaboration share file service.

At least some of the web applications comprise Software as a Service (SaaS) applications. At least some of the managed browsers comprise embedded browsers installed on the client devices.

Another aspect is directed to a collaboration server that includes a memory and a processor cooperating with the memory to communicate with a plurality of client devices operated by users collaborating on a project, with each client device configured to remotely access a plurality of web applications via a managed browser to be used by the users collaborating on the project. The processor and memory cooperate with the managed browsers to receive from the managed browsers data corresponding to actions performed by each user within the web applications, generate notifications based on the actions performed by the users within the web applications, and cause the managed browsers to display the notifications. The notifications are generated independent from the web applications.

Yet another aspect is directed to a method for operating a collaboration server as described above. The method includes communicating with a plurality of client devices operated by users collaborating on a project, with each client device configured to remotely access a plurality of web applications via a managed browser to be used by the users collaborating on the project. The collaboration server cooperates with the managed browsers to receive from the managed browsers data corresponding to actions performed by each user within the web applications, generate notifications based on the actions performed by the users within the web applications, and cause the managed browsers to display the notifications. The notifications are generated independent from the web applications.

Yet another aspect is directed to a client device comprising a memory and a processor cooperating with the memory to remotely access a plurality of web applications via an embedded browser to be used by a user collaborating on a project, and send data from the embedded browser to a server. The data corresponds to actions performed by the user within the web applications. The server is configured to generate notifications based on the actions performed by the user within the web applications, with the notifications being generated independent from the web applications. The notifications are displayed by the embedded browser.

BRIEF DESCRIPTION OF THE DRAWINGS

FIG. 10 is a screen shot of the notifications displayed on a project web page based on the historical audit data category being selected in FIG. 9.

DETAILED DESCRIPTION

In an enterprise or organization, it is common for team members to collaborate on a project. When the project is based on web applications that support collaboration, the applications make it straightforward for team members to be aware of updates and changes as they are being made on the project. For example, Google Docs provided by Google Inc. and Office 365 provided by Microsoft Corp. support collaboration. Edits may be tracked by team members with a revision history presenting changes made on the project.

However, when the project involves web applications that are not designed to work together or do not support collaboration, it becomes more difficult to properly track changes that various team members make as the project progresses. Even though Google Docs and Office 365 support collaboration, they are not intended to cooperate or communicate with one another. For example, if Microsoft Excel, which is included within Office 365, is used with Google Docs, it becomes more challenging to properly track changes made in the project. As another example, if the project uses a budget and expense web application, such as SAP Concur provided by SAP, a team member would have to log directly into SAP Concur to view any updates and changes since this web application does not support collaboration.

The techniques and teachings of the present disclosure provide the ability to display notifications based on the actions performed by team members within the web applications being used on the project, wherein the notifications are generated independent from the web applications. In other words, the web applications do not generate the notifications, as is the case with Google Docs and Office 365, for example. Instead, the notifications are based on data collected by a managed browser within each client device accessing the web applications.

Figure 1:
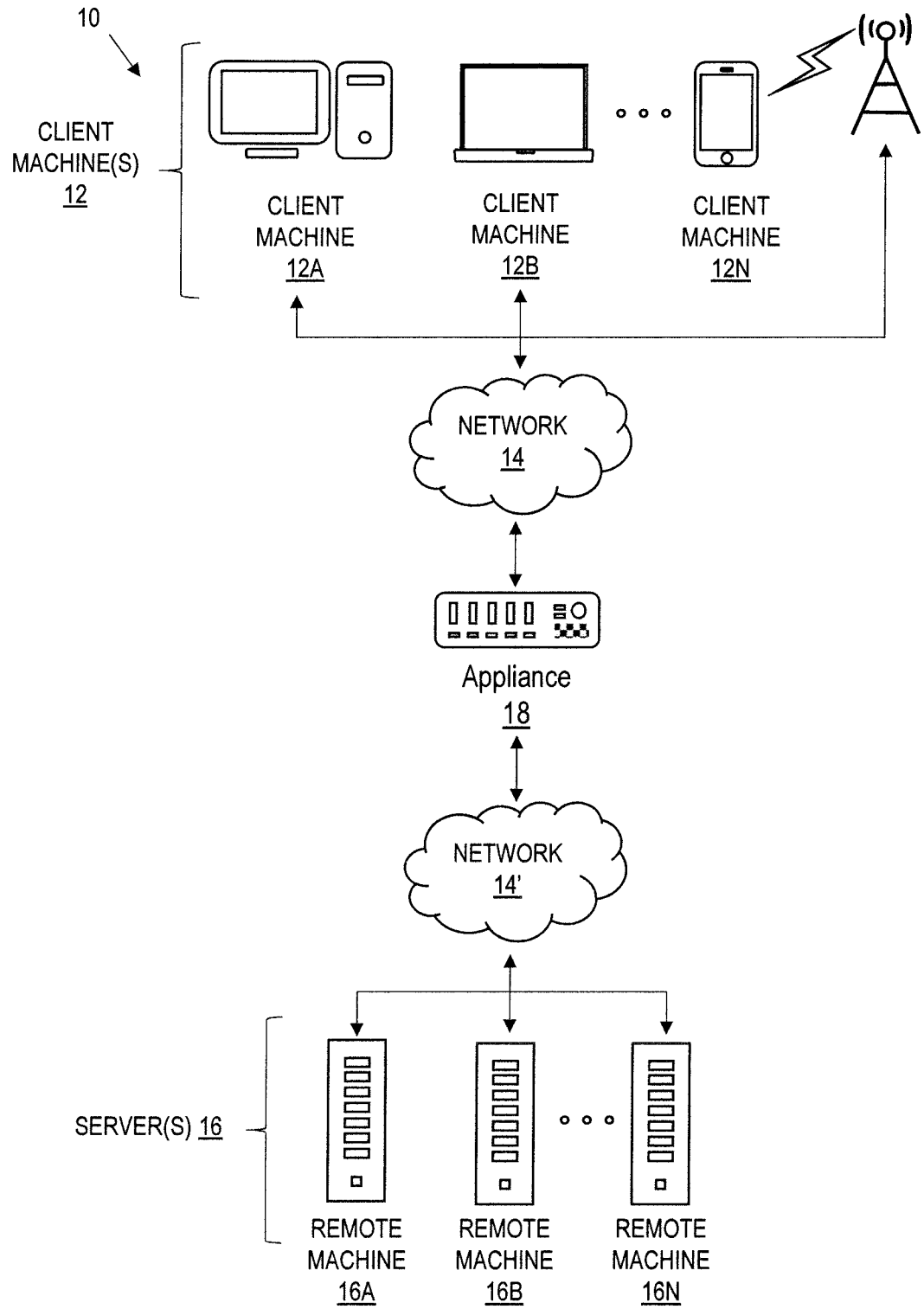
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14;

and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
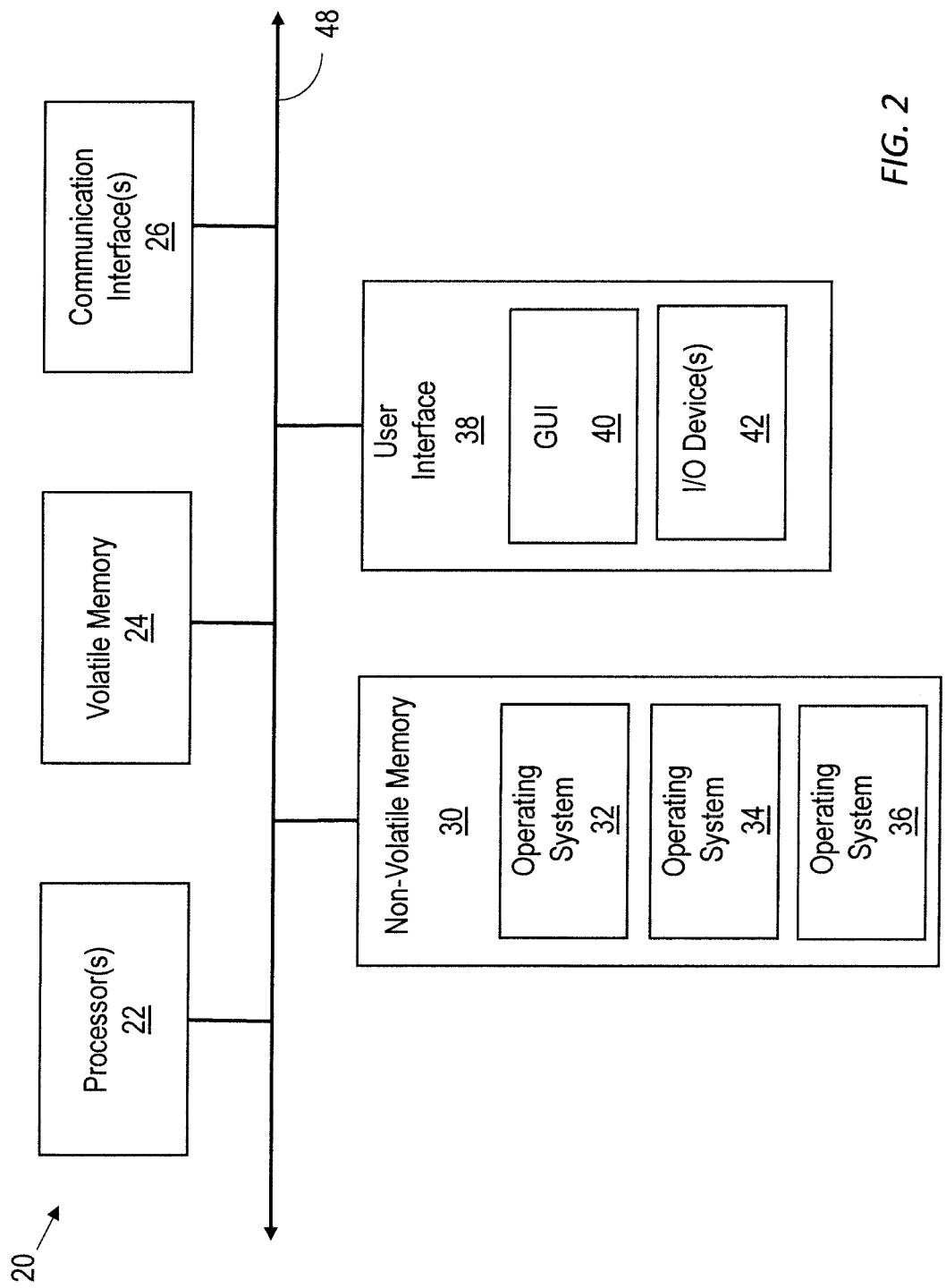
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
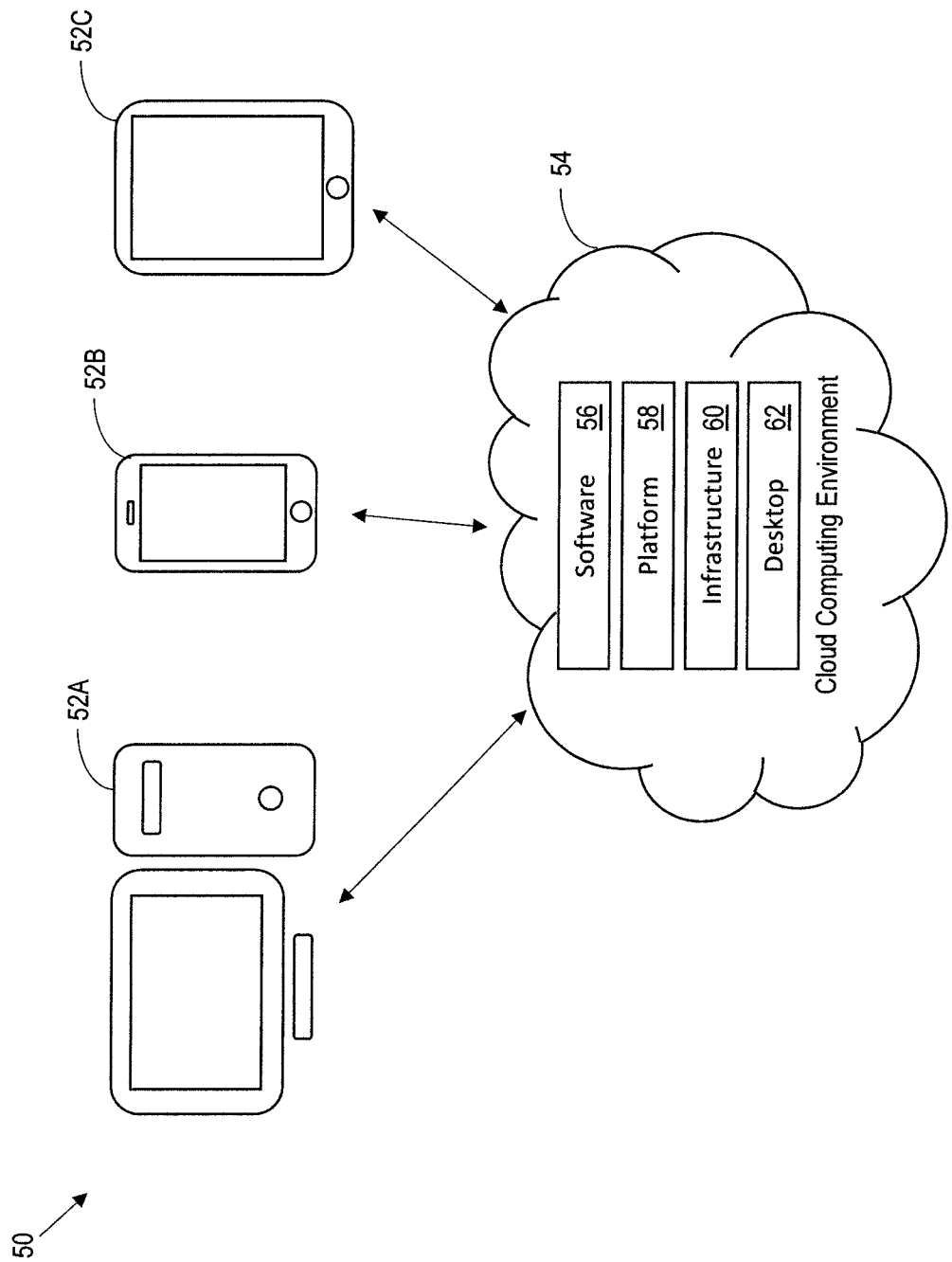
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
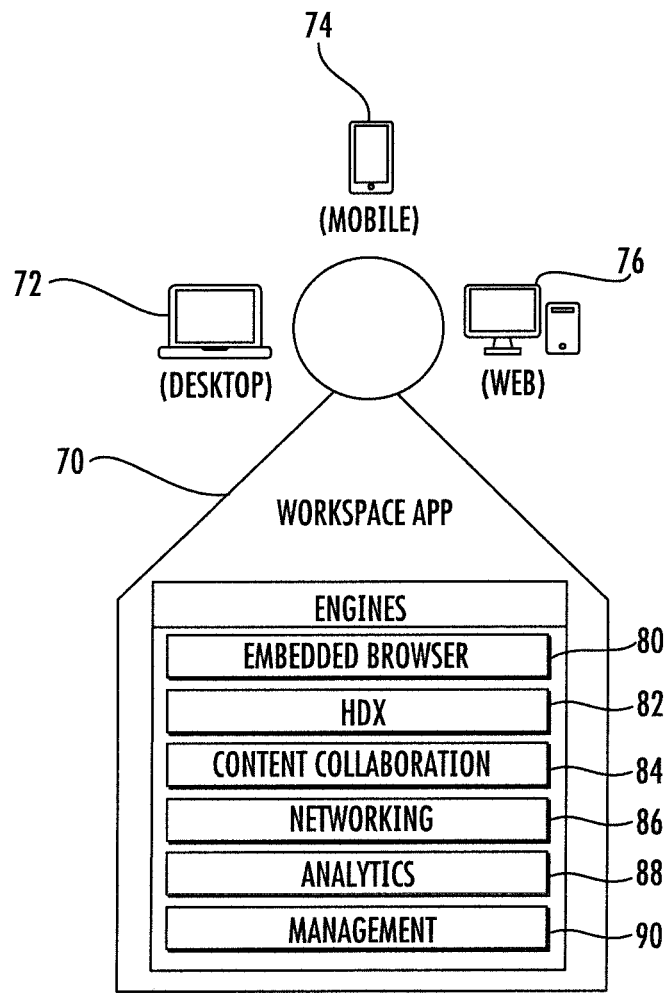
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
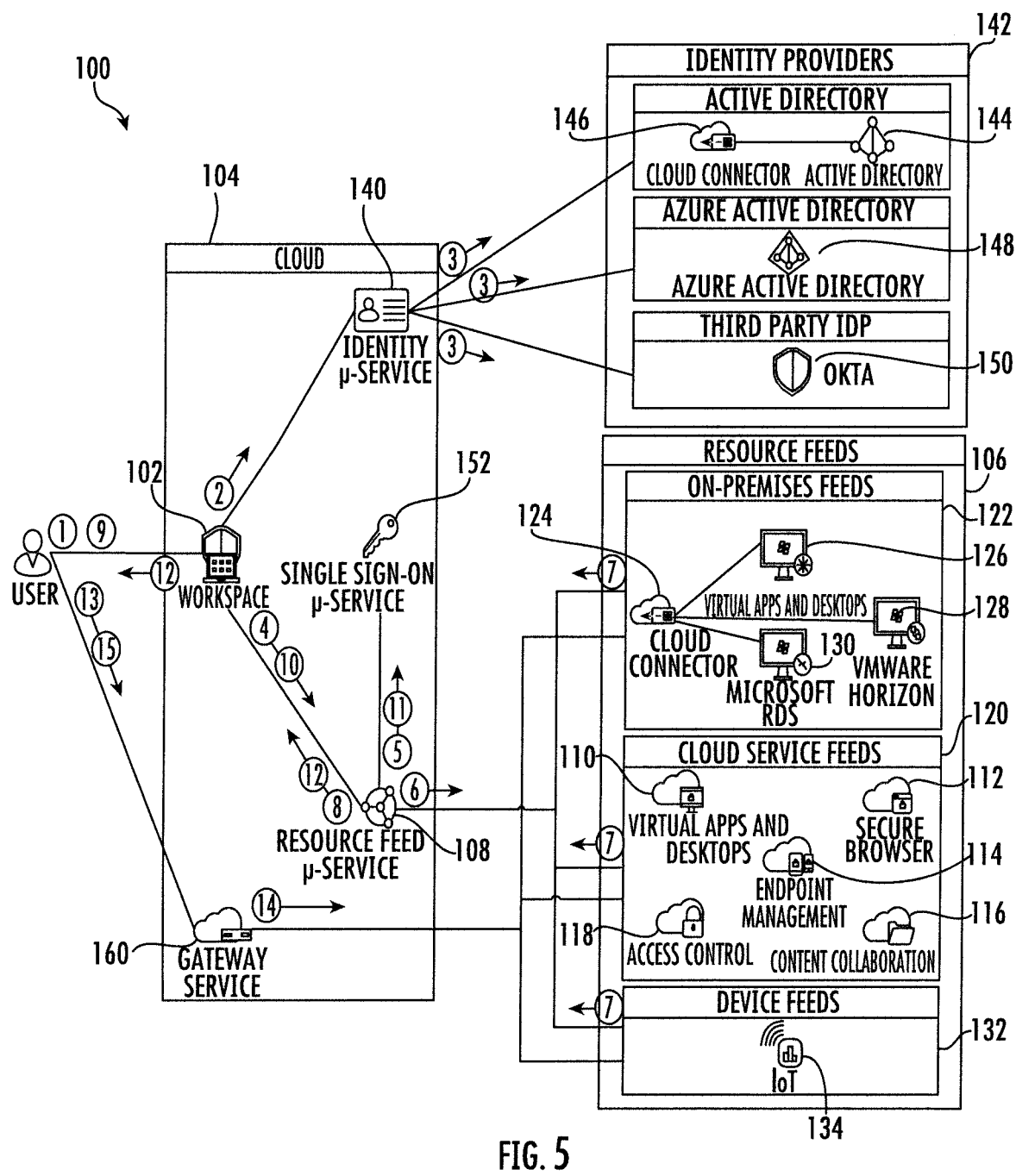
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
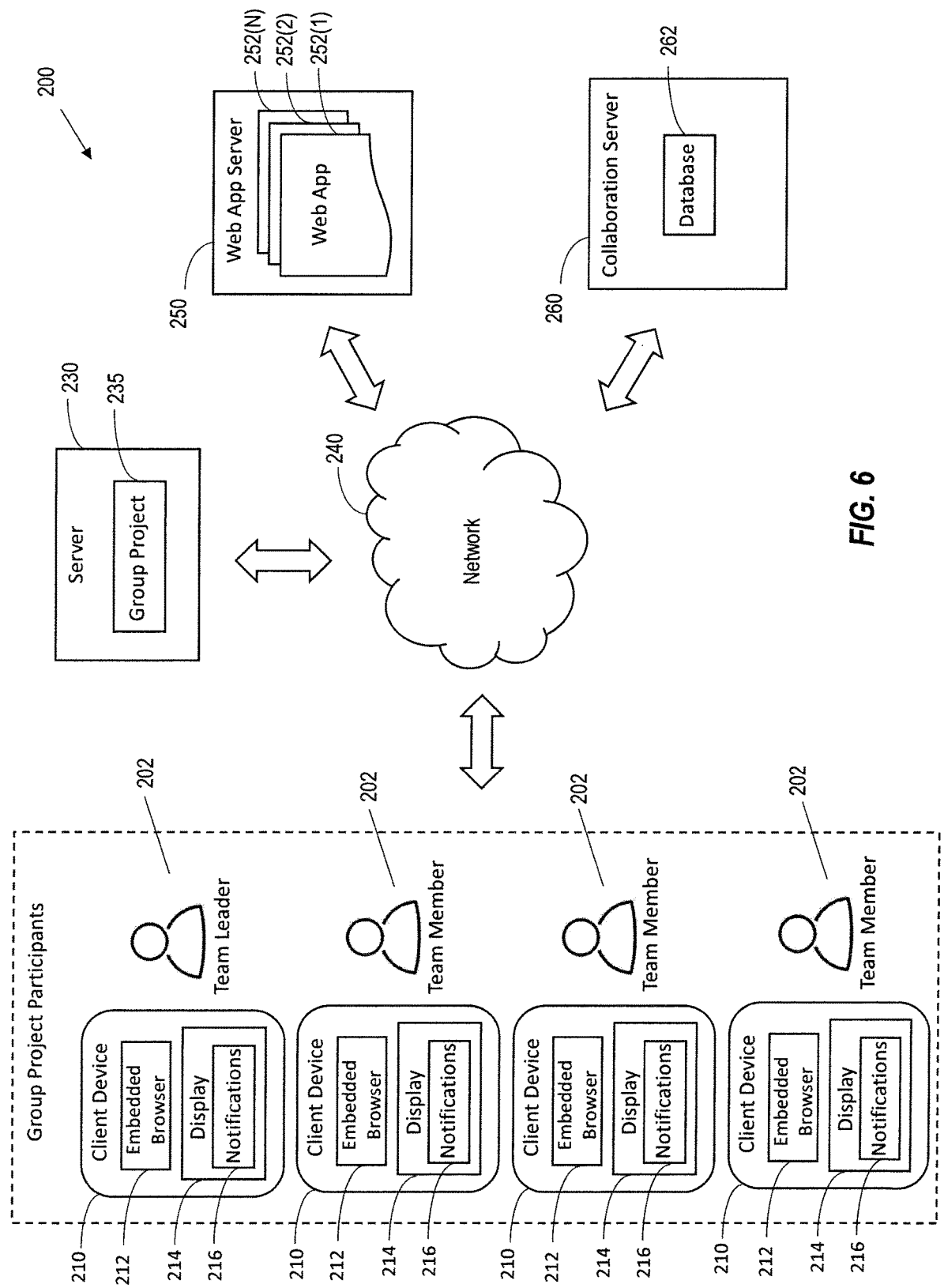
FIG. 6 is a schematic block diagram of a computer system illustrating notifications being displayed based on actions performed by team members within web applications used to collaborate on a group project, in which various aspects of the disclosure may be implemented.

Referring now to FIG. 6, a computer system 200 providing the ability to display notifications 216 based on actions performed by team members 202 within different web applications 252(1)-252(N) being used to collaborate on a group project 235 will be discussed. The notifications 216 are generated independent from the web applications 252(1)-252(N), and allow team members 202 to be aware of updates and changes being made on the group project 235. The web applications 252(1)-252(N) do not generate the notifications 216, instead, the notifications 216 are generated based on data collected by a managed browser within each client device 210 accessing the web applications 252(1)-252 (N).

The notifications 216 are helpful to team members 202 when one or more of the web applications 252(1)-252(N) do not support collaboration, or when the web applications 252(1)-252(N) are not designed to work together (i.e., collaboration among web applications). The notifications 216 may be stored in a database 262 to provide a historical audit or record of actions performed by team members 202 over the course of the group project 235.

As noted above, Google Docs and Office 365 support collaboration. Edits may be tracked by team members 202 with a revision history presenting changes made on the project. Even though Google Docs and Office 365 support collaboration, they are not intended to cooperate or communicate with one another. As also noted above, SAP Concur is a budget and expense web application that does not support collaboration. For a team member 202 to view any updates and changes made in the group project 235 via SAP Concur, the team member 202 needs to log directly into the web application.

The computer system 200 illustratively includes client devices 210 operated by team members 202 collaborating on the group project 235 via one or more networks 240. The different web applications 252(1)-252(N) are provided via one or more web servers 250. For illustration purposes, there are N different web applications, i.e., 252(1)-252(N). Each client device 210 is configured to remotely access the web applications 252(1)-252(N) via a managed browser to be used by team members 202 collaborating on the group project 235. The group project 235 is typically based on documents and files created by team members 202 via the web applications 250, as well as other inputs that may be provided by the web applications 250 in support of the group project 235. The group project 235 is illustrated as being stored in a separate server 230, which may be hosted on a public cloud computing infrastructure such as Microsoft Azure and Amazon Web Services.

The managed browsers may take the form of embedded browsers 212 which are installed and run on the client devices 210 as shown, as well as hosted browsers that are run by a virtualization service. An example embedded browser 212 is Citrix Embedded Browser (CEB) which is part of the Citrix Workspace App 70 as discussed above, and an example hosted browser is Citrix Secure Browser. As will be discussed in more detail below, the embedded browsers 212 advantageously collect data relating to actions performed by each team member 202 within the web applications 252(1)-252(N).

At least one collaboration server 260 cooperates with the embedded browsers 212 to receive from the embedded browsers 212 the data corresponding to actions performed by each team member 202 within the web applications 252(1)-252(N). Notifications 216 are generated in response to the actions performed by team members 202 within the web applications 252(1)-252(N). As noted above, the notifications are generated independent from the web applications 252(1)-252(N). The embedded browsers 212 then display the notifications 216.

The web applications 252(1)-252(N) may be generally referred to as web applications 252. There is no limit on the number of web applications 252 that may be used on the group project 235, but as the number of web applications 252 increase, so does the difficulty in accurately tracking actions performed by team members 202 within the web applications 252. The increased difficulty is due to the web applications 252 likely including a web application 252 that does not support collaboration or a web application 252 that is not designed to work with other web applications.

As noted above, example web applications for word processing that support collaboration are Google Docs and Office 365. Since Office 365 supports other Microsoft products, such as Excel, PowerPoint, OneDrive and Outlook, these Microsoft applications are all designed to work or collaborate together. The collaboration feature in Office 365 makes it easier for team members 202 to be aware of updates and changes made on the group project 235 using these web applications.

When the group project 235 involves web applications that are not designed to work together or do not support collaboration, it becomes more difficult to properly track changes that various team members 202 make as the group project 235 progresses. For example, if the group project 235 requires generation and approval of budgets and expense reports, then SAP Concur as discussed above may be used. Since SAP Concur is provided by a corporation other than Google Inc. or Microsoft Corp., SAP Concur is not written to collaborate or interface with Google Inc. or Office 365. To compound the problem of notifying team members 202 on budget updates and changes, each team member 202 would have to log directly into SAP Concur to view the updates and changes since this web application does not support collaboration. As another example, team members 202 may be using Workday as part of the group project 235. Workday is provided by Workday, Inc. and is used by team members 202 when requesting paid time off (PTO). Since Workday does not support collaboration among team members 202, team members may not be aware when PTO has been approved for a team member. If completion of the group project 235 has a deadline, for example, then the team leader may not want a team member taking time off from the group project 235.

Figure 7:
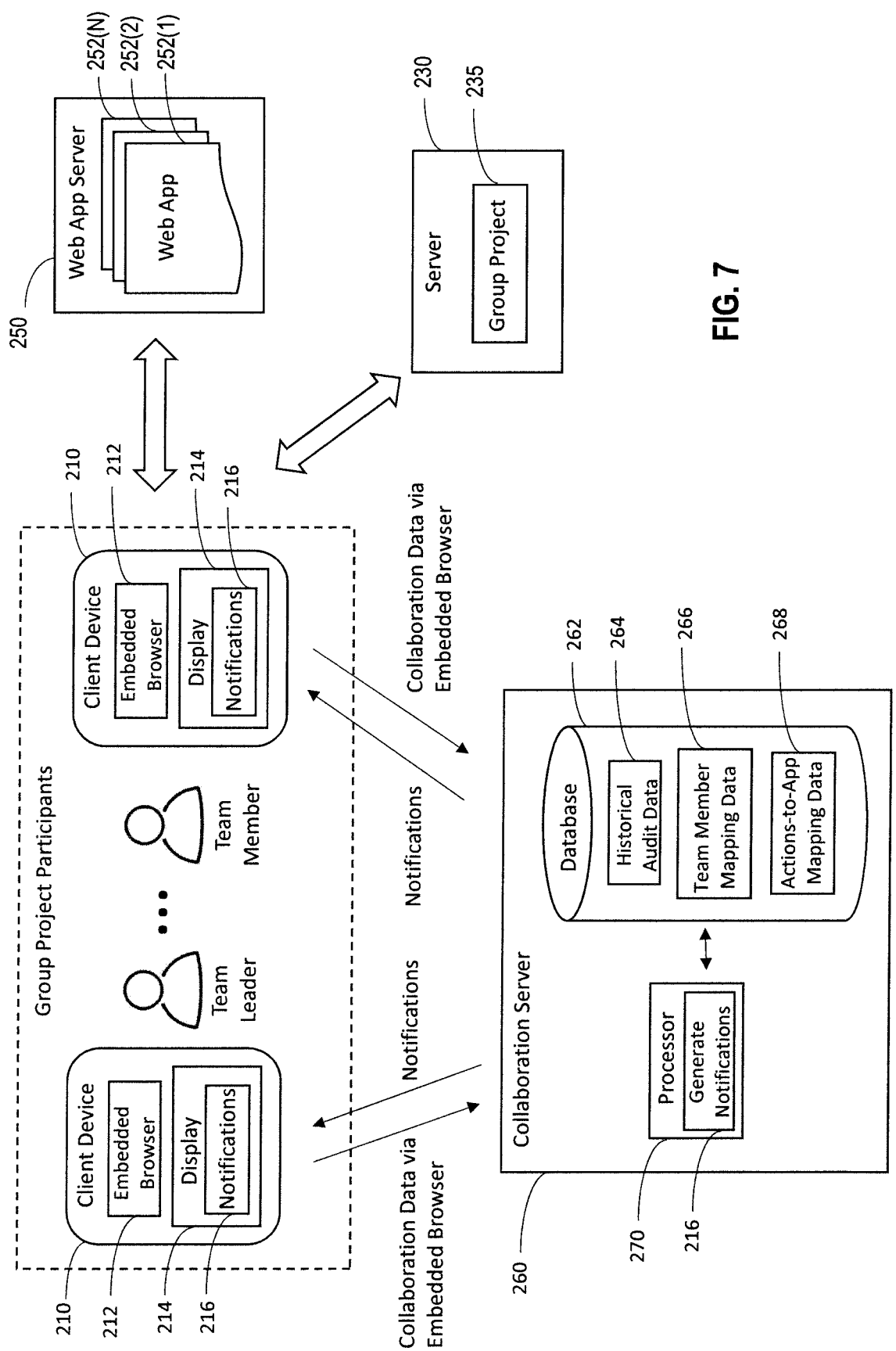
FIG. 7 is a more detailed schematic block diagram of the collaboration server cooperating with the embedded browsers to generate the notifications as illustrated in FIG. 6.

Cooperation between the collaboration server 260 and the embedded browser 212 to generate the notifications 216 will now be discussed in reference to FIG. 7. As noted above, the embedded browser 212 may be a Citrix Embedded Browser (CEB). The Citrix Embedded Browser is hosted on a Citrix Server, with a user interface (UI) delivered to the Citrix Workspace App 70 via independent computing architecture (ICA) or Citrix high definition experience (HDX) technologies.

The UI interface allows a team leader of the group project 235 or an information technology (IT) personnel familiar with the group project 235 to set the parameters of the group project 235. The parameters to be set include identifying the team members 202, selecting the web applications 252 to be used on the group project 235, and defining the actions performed by team members within the web applications 235 that are to be tracked. The embedded browser 212 advantageously monitors the web applications 252 and the actions performed by the team members 202 within the web applications 252.

The embedded browser 212 may be configured to collect collaboration data on all actions that team members 202 perform in the web applications 252 or a subset of these actions. Collaboration data may be generally referred to as data. The actions to be tracked typically include changes/updates in the group project 235 made by team members 202 using the web applications 252. Even if a web application 252 supports collaboration, actions performed by team members 202 within the web application 252 may still be monitored by the embedded browser 212. When collaboration data is collected across all of the web applications 252 being used in the group project 235, this accurately provides a unified look across all of the web applications 252.

The collected collaboration data is based on the client devices 210 providing a feed from the embedded browsers 212 to the collaboration server 260 (e.g., when apps open/close, browser commands, etc.). This information further includes what uniform resource locators (URL) the team members 202 are looking at within the web applications 252. The URLs may be directed to specific areas within a web application 252. For example, a sub-URL inside a web application 252 may correspond to a form requiring data to be filled in by a team member 202. The collaboration data is thus based on browser commands (i.e., actions taken by team members 202) correlated to what is being performed within the web applications 252.

Since the embedded browsers 212 interface between the team members 202 and the web applications 252, the embedded browsers are able to determine actions performed by the team members 202 within the web applications 252. The embedded browsers 212 in cooperation with the collaboration server 360 can then capture cross-web application actions to files, documents and actions performed by team members 202, and store this for historical display to other members 202 of the team.

The actions being collected by the embedded browsers 212 may further include what team members 202 do with the files that are generated for the group project 235. For example, the embedded browser 212 may collect collaboration data on when a file is uploaded to ShareFile. ShareFile is provided by Citrix Systems and is a secure way to share files. Other example actions may further include when a file is read by a team member 202 or when a file is deleted by a team member 202. The example actions are not to be limiting as team members 202 may perform other types of actions as readily appreciated by those skilled in the art.

The collaboration data collected by the embedded browsers 212 is provided to the collaboration server 260. The collaboration server 260 may be separate from the server 230 hosting the group project 235, as illustrated. Alternatively, functions of the collaboration server 260 and the server 230 are combined into the same server.

The collaboration server 260 includes a processor 270 and a database 262. The processor 270 generates the notifications 216 based on the received collaboration data. The processor 270 may organize the collaboration data in the database 262 into different categories. The categories include historical audit data 264, team member mapping data 266 and action-to-web application mapping data 268.

The historical audit data 264 may also be referred to as historical data or as a record. The historical audit data 264 provides the actions performed by the team members 202 over the course of the group project 235. For example, historical audit data 264 may include all the changes made to the word processing files in the group project 235. The historical audit data 264 allows team members to view the history of the group project 235, which may be helpful when the group project 235 is audited.

The team member mapping data 266 may also be referred to as team member data. The team member mapping data 266 separates out the actions performed by each team member 202 in the group project 235. This may be helpful to determine a level of contribution made by a team member 202 on the group project 235.

The action-to-web application mapping data 268 may also be referred to as action data. The action-to-web application mapping data 268 separates out the actions performed by team members 202 for each web application 252. This may be helpful to determine how each web application 252 was used in the group project 235.

Figure 8:
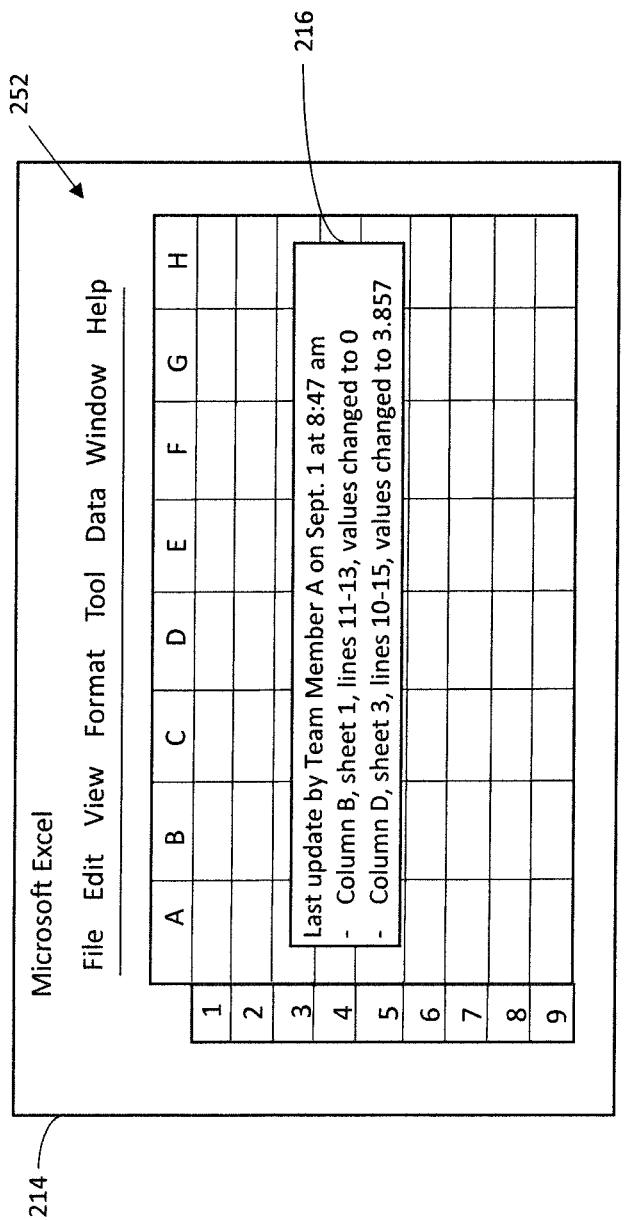
FIG. 8 is a screen shot of a web page from a web application being accessed by a client device with a notification displayed as a graphical overlay by the computer system of FIG. 6.

As noted above, the collaboration server 260 cooperates with the embedded browsers 212 to display the notifications 216 on a display 214 within each of the client devices 210. The notifications 216 may comprise graphical overlays or pop-up windows as illustrated in FIG. 8.

For example, the notification 216 may be displayed over the web application 252 to which it pertains to when accessed by team members 202. The illustrated web application 252 being accessed by a team member 202 is an Excel spreadsheet. The notification 216 lets the team members 202 know when the most recent changes were made, as well as which team member made the changes and what the changes were. Alternatively, the notification 216 may be displayed to team members 202 even if the team members 202 are not accessing the Excel spreadsheet.

Figure 9:
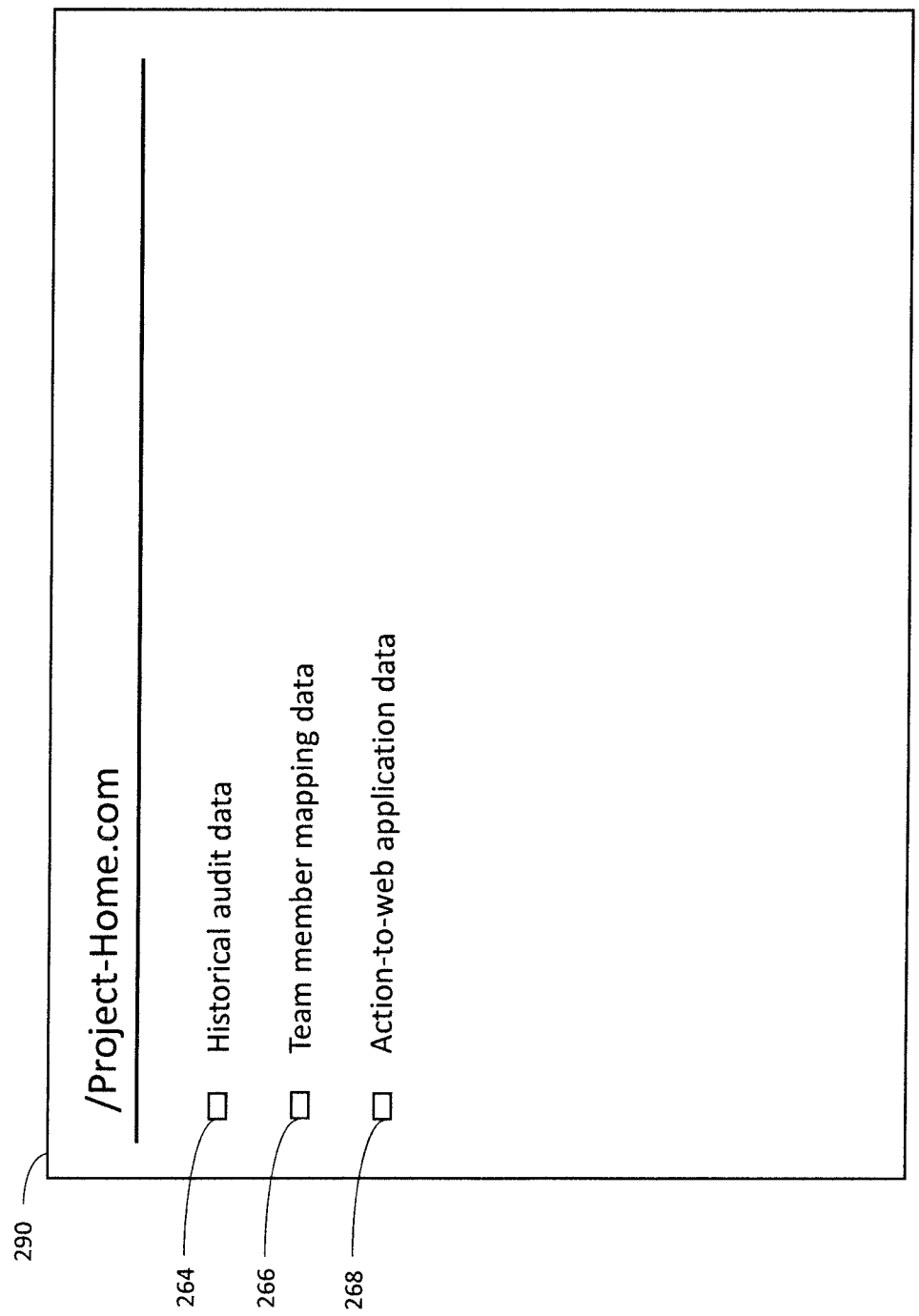
FIG. 9 is a screen shot of a project home web page providing different categories in which the notifications are to be displayed by the computer system of FIG. 6.

Referring now to FIGS. 9 and 10, the notifications 216 may be provided on project web pages 290, 292. The project web pages 290, 292 are accessed via the embedded browsers 212 by team members 202. The embedded browser 212 for each client device 210 may display an icon that provides a link to project web page 290 as provided in FIG. 9, which is a home page providing options to the team members on how to view the notifications 216. Although not shown, the icon may be positioned alongside a tool bar associated with each web application 252, for example. The icon is generated by the embedded browser 212 and is not generated by the web applications 252.

As noted above, the collaboration data collected by the embedded browsers 212 may be organized into different categories. The categories include historical audit data 264, team member mapping data 266 and action-to-web application mapping data 268. When a team member 202 selects historical audit data 264, for example, web page 292 may be displayed as provided in FIG. 10. The illustrated web page 292 provides notifications 216 of the actions taken by all team members 202 within the web applications 252 being used on the group project 235.

Figure 11:
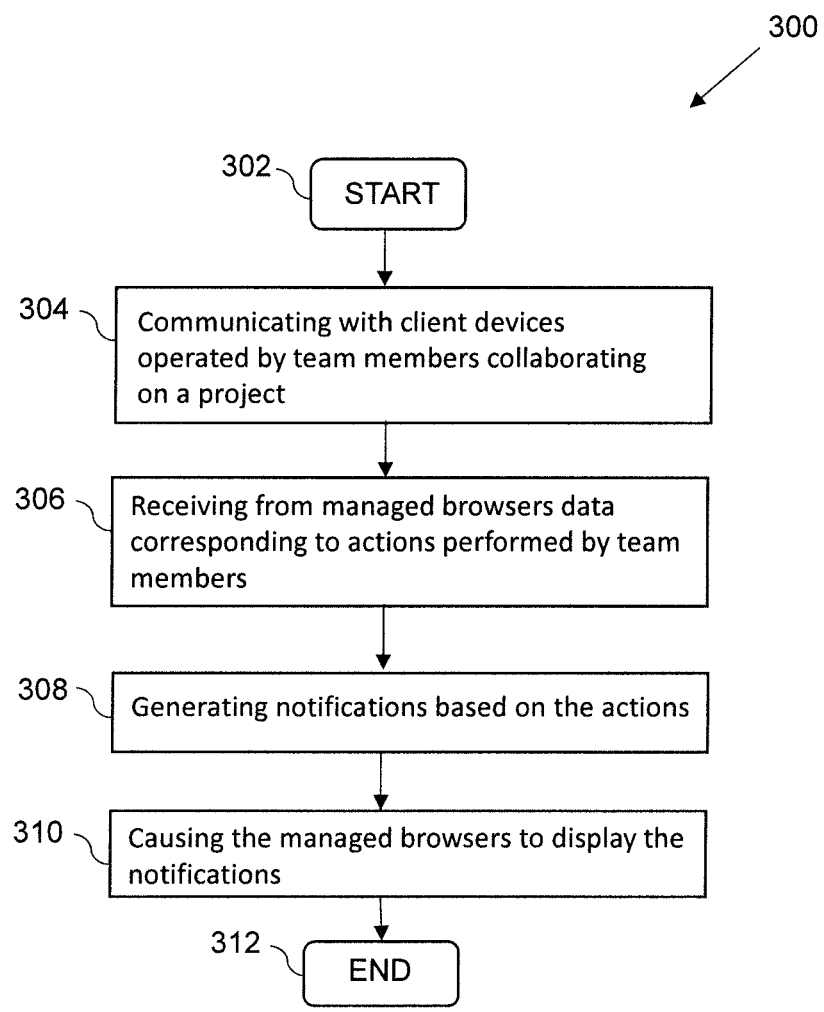
FIG. 11 is a flowchart illustrating a method for operating the collaboration server illustrated in FIG. 6.

Referring now to FIG. 11, a flowchart 300 illustrating a method for operating the collaboration server 260 will be discussed. From the start (Block 302), the method includes communicating with the client devices 210 operated by team members 202 collaborating on a group project 235 at Block 304. Each client device 210 is configured to remotely access web applications 252 via a managed browser 212 to be used by the team members 202 collaborating on the group project 235. Data corresponding to actions performed by each team member 202 within the web applications 252 is received from the managed browsers 212 at Block 306. Notifications 216 are generated at Block 308 based on the actions performed by the team members 202 within the web applications 252. As described above, the notifications 216 are generated independent from the web applications 252. The method further includes causing the managed browsers to display the notifications 216 at Block 310. The method ends at Block 312.

Figure 12:
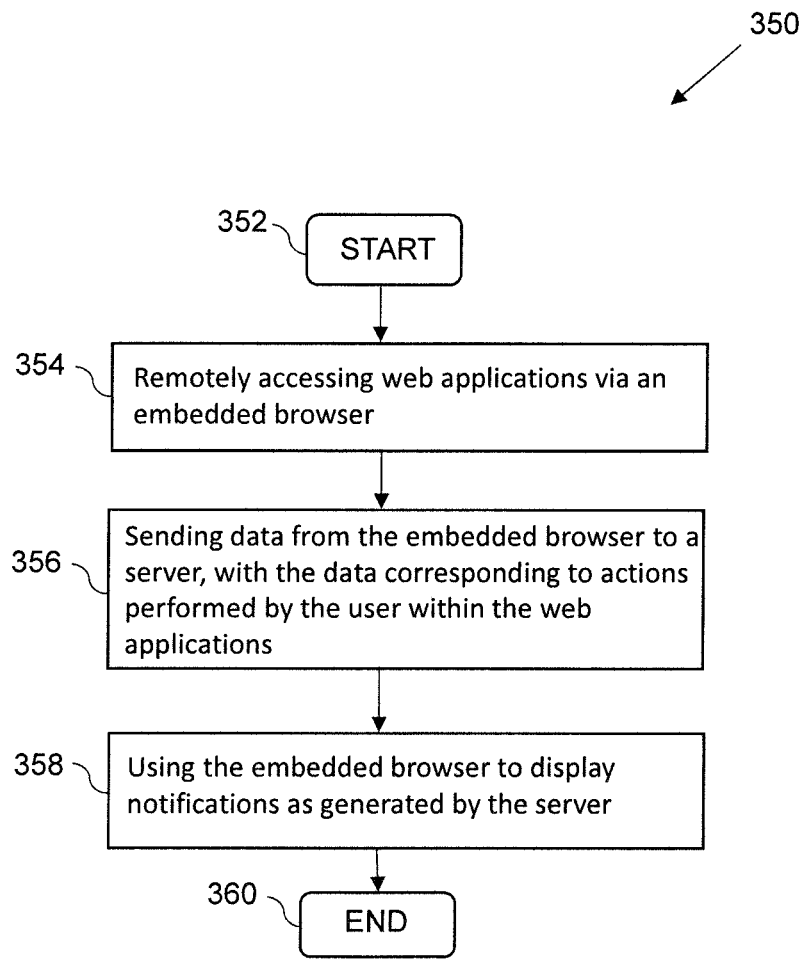
FIG. 12 is a flowchart illustrating a method for operating the client device illustrated in FIG. 6.

Referring now to FIG. 12, a flowchart 350 illustrating a method for operating the client device 210 will be discussed. From the start (Block 352), the method includes remotely accessing a plurality of web applications 252 at Block 354 via an embedded browser 212 to be used by a team member 202 collaborating on a group project 235. Data is sent from the embedded browser 212 to a collaboration server 260 at Block 356. The data corresponds to actions performed by the team member 202 within the web applications 252. The collaboration server 260 is configured to generate notifications 216 at Block 358 based on the actions performed by the team member 202 within the web applications 252, with the notifications 212 being generated independent from the web applications 252. The notifications 212 are displayed by the embedded browser 212. The method ends at Block 360.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computer system comprising:
a plurality of client devices operated by users collaborating on a project, with each client device configured to remotely access a plurality of web applications via a managed browser to be used by the users collaborating on the project, and with the managed browsers having a user interface (UI) to allow parameters of the project to be set to determine when collaboration data is to be collected; and
at least one server cooperating with the managed browsers to
receive from the managed browsers data corresponding to actions performed by each user within the web applications, with the data being collected by the managed browsers in response to each user accessing the project within the set parameters,
generate notifications based on the actions performed by the users within the web applications, with the notifications being generated independent from the web applications, and
cause the managed browsers to display the notifications to the users collaborating on the project even if the users are not accessing the web applications.

2. The computer system according to claim 1 wherein the notifications comprise graphical overlays displayed over the web applications.

3. The computer system according to claim 1 wherein the notifications are provided on project web pages.

4. The computer system according to claim 1 wherein said at least one server is further configured to compare the actions performed by at least one user to a set of actions, with the notifications being displayed based on the performed actions being in the set of actions.

5. The computer system according to claim 1 wherein said at least one server is further configured to store the received data so as to provide a record of actions performed by the users collaborating on the project.

6. The computer system according to claim 1 wherein said at least one server is further configured to map the actions performed by the users to at least one respective web application.

7. The computer system according to claim 1 wherein said at least one server is further configured to map the actions performed by at least one users collaborating on the project.

8. The computer system according to claim 1 wherein the project is based on documents created by the web applications.

9. The computer system according to claim 8 wherein at least some of the actions performed by the users within the web applications correspond to changes made in the created documents.

10. The computer system according to claim 8 wherein at least some of the actions performed by the users within the web applications correspond to at least one of reading a document, deleting a document, approving a document, making a request via a document, and uploading a document to a collaboration share file service.

11. The computer system according to claim 1 wherein at least some of the web applications comprise Software as a Service (SaaS) applications.

12. The computer system according to claim 1 wherein at least some of the managed browsers comprise embedded browsers installed on said client devices.

13. A computing device comprising:
a memory and a processor cooperating with said memory to
communicate with a plurality of client devices operated by users collaborating on a project, with each client device configured to remotely access a plurality of web applications via a managed browser to be used by the users collaborating on the project, and with the managed browsers having a user interface (UI) to allow parameters of the project to be set to determine when collaboration data is to be collected, and
cooperate with the managed browsers to
receive from the managed browsers data corresponding to actions performed by each user within the web applications, with the data being collected by the managed browsers in response to each user accessing the project within the set parameters,
generate notifications based on the actions performed by the users within the web applications, with the notifications being generated independent from the web applications, and
cause the managed browsers to display the notifications to the users collaborating on the project even if the users are not accessing the web applications.

14. The computing device according to claim 13 wherein the notifications comprise graphical overlays displayed over the web applications.

15. The computing device according to claim 13 wherein the notifications are provided on project web pages.

16. The computing device according to claim 13 wherein said processor is further configured to compare the actions performed by at least one user to a set of actions, with the notifications being displayed based on the performed actions being in the set of actions.

17. A method comprising:
communicating with a plurality of client devices operated by users collaborating on a project, with each client device configured to remotely access a plurality of web applications via a managed browser to be used by the users collaborating on the project, and with the managed browsers having a user interface (UI) to allow parameters of the project to be set to determine when collaboration data is to be collected; and
cooperating with the managed browsers to
receive from the managed browsers data corresponding to actions performed by each user within the web applications, with the data being collected by the managed browsers in response to each user accessing the project within the set parameters,
generate notifications based on the actions performed by the users within the web applications, with the notifications being generated independent from the web applications, and
cause the managed browsers to display the notifications to the users collaborating on the project even if the users are not accessing the web applications.

18. The method according to claim 17 wherein the notifications comprise graphical overlays displayed over the web applications.

19. The method according to claim 17 wherein the notifications are provided on project web pages.

20. The method according to claim 17 further comprising comparing the actions performed by at least one user to a set of actions, with the notifications being displayed based on the performed actions being in the set of actions.

21. A computing device comprising:
a memory and a processor cooperating with said memory to
remotely access a plurality of web applications via an embedded browser to be used by a user collaborating on a project with other users, with the embedded browser collecting data corresponding to actions performed by the user within the web applications, and with the managed browsers having a user interface (UI) to allow parameters of the project to be set to determine when collaboration data is to be collected,
send the collected data from the embedded browser to a server in response to each user accessing the project within the set parameters, with the server configured to generate notifications based on the actions performed by the user within the web applications, and with the notifications being generated independent from the web applications, and
display the notifications within the embedded browser to the users collaborating on the project even if the users are not accessing the web applications.

* * * * *